(12) United States Patent
Jahn et al.

(10) Patent No.: US 10,454,405 B2
(45) Date of Patent: Oct. 22, 2019

(54) DRIVER ASSEMBLY

(71) Applicant: Lemförder Electronic GmbH, Espelkamp (DE)

(72) Inventors: Jorg Jahn, Bünde (DE); Thomas Erdmann, Stemwede (DE); Ajoy Palit, Bremen (DE)

(73) Assignee: Lemförder Electronic GmbH, Espelkamp (DE)

( * ) Notice: Subject to any disclaimer, the term of this patent is extended or adjusted under 35 U.S.C. 154(b) by 376 days.

(21) Appl. No.: 15/300,410

(22) PCT Filed: Feb. 19, 2015

(86) PCT No.: PCT/EP2015/053466
§ 371 (c)(1),
(2) Date: Sep. 29, 2016

(87) PCT Pub. No.: WO2015/149986
PCT Pub. Date: Oct. 8, 2015

(65) Prior Publication Data
US 2017/0179795 A1 Jun. 22, 2017

(30) Foreign Application Priority Data
Mar. 31, 2014 (DE) .................. 10 2014 205 957

(51) Int. Cl.
*H02K 11/33* (2016.01)
*H02K 9/22* (2006.01)
(Continued)

(52) U.S. Cl.
CPC .............. *H02P 29/60* (2016.02); *H02K 9/22* (2013.01); *H02K 11/33* (2016.01); *H02P 25/022* (2013.01); *H02P 25/024* (2016.02); *H02P 29/00* (2013.01)

(58) Field of Classification Search
CPC ...... H02M 7/537; H02M 7/003; H02K 11/33; H02K 11/30; H02K 9/22; H02P 29/60; H02P 29/68; H02P 25/022
See application file for complete search history.

(56) References Cited

U.S. PATENT DOCUMENTS

| 5,444,295 A | * | 8/1995 | Lake | ........................ H01L 23/66 |
|  |  |  |  | 257/678 |
| 7,081,694 B2 | * | 7/2006 | Hans | ...................... H02K 11/33 |
|  |  |  |  | 310/64 |

(Continued)

FOREIGN PATENT DOCUMENTS

| CN | 102355150 A | 2/2012 |
| CN | 203120363 U | 8/2013 |

(Continued)

OTHER PUBLICATIONS

German Office Action dated Sep. 8, 2014 for German Patent Application No. DE 10 2014 205 957.7 (German language, 7 pages).

(Continued)

*Primary Examiner* — Edgardo San Martin
(74) *Attorney, Agent, or Firm* — Brinks Gilson & Lione

(57) ABSTRACT

A driver assembly comprises a predetermined number of semiconductor switches, wherein one of the semiconductor switches is arranged inside of a circular curve and the remaining semiconductor switches are arranged on the circular curve.

20 Claims, 4 Drawing Sheets

(51) Int. Cl.
*H02P 29/60* (2016.01)
*H02P 29/00* (2016.01)
*H02P 25/022* (2016.01)
*H02P 25/024* (2016.01)
*H02K 11/30* (2016.01)

(56) References Cited

U.S. PATENT DOCUMENTS

| | | | |
|---|---|---|---|
| 7,180,212 B2* | 2/2007 | Anwar | H02P 25/18 310/68 R |
| 7,362,001 B2* | 4/2008 | Kusumi | H02J 7/248 290/31 |
| 7,417,861 B2* | 8/2008 | Kikuchi | H01L 25/162 361/718 |
| 7,983,046 B1 | 7/2011 | Borzabadi et al. | |
| 8,304,942 B2* | 11/2012 | Yamasaki | H02K 3/522 310/64 |
| 8,704,415 B2* | 4/2014 | Kato | H02K 11/048 310/68 B |
| 8,884,559 B2* | 11/2014 | Murata | H02P 29/00 318/400.01 |
| 9,123,693 B2* | 9/2015 | Tanaka | B62D 5/0406 |
| 9,425,673 B2* | 8/2016 | Miyama | H02K 5/24 |
| 9,917,533 B2* | 3/2018 | Jahn | H05K 7/209 |
| 2002/0053841 A1* | 5/2002 | Asao | H02K 5/141 310/68 B |
| 2004/0124726 A1* | 7/2004 | Hans | H02K 11/33 310/71 |
| 2004/0183385 A1* | 9/2004 | Takahashi | H01L 23/3672 310/68 D |
| 2005/0258690 A1* | 11/2005 | Kusumi | H02K 11/048 310/68 D |
| 2006/0002054 A1 | 1/2006 | Anwar et al. | |
| 2006/0087181 A1* | 4/2006 | Kusumi | H02J 7/248 310/68 D |
| 2006/0208581 A1* | 9/2006 | Ikuta | H02K 5/18 310/58 |
| 2007/0103101 A1* | 5/2007 | Kikuchi | H02K 11/048 318/140 |
| 2009/0243407 A1* | 10/2009 | Kato | H02K 11/048 310/62 |
| 2010/0327678 A1* | 12/2010 | Yamasaki | H02K 3/522 310/64 |
| 2011/0067945 A1* | 3/2011 | Sonoda | B62D 5/0406 180/444 |
| 2011/0273122 A1 | 11/2011 | Murata et al. | |
| 2012/0181903 A1* | 7/2012 | Kato | H02K 11/048 310/67 R |
| 2013/0141871 A1* | 6/2013 | Omae | B62D 5/0406 361/709 |
| 2013/0249356 A1* | 9/2013 | Nakano | H02K 5/24 310/68 D |
| 2014/0151146 A1* | 6/2014 | Tanaka | B62D 5/0406 180/443 |
| 2014/0340013 A1* | 11/2014 | Li | H02K 3/28 318/400.26 |
| 2015/0001972 A1* | 1/2015 | Miyanna | H02K 5/24 310/52 |
| 2016/0134178 A1* | 5/2016 | Acinas Lope | B62D 5/0406 310/64 |
| 2016/0149525 A1* | 5/2016 | Owen | H02M 7/003 318/400.26 |

FOREIGN PATENT DOCUMENTS

| | | | | |
|---|---|---|---|---|
| DE | 10100620 | A1 | 1/2001 | |
| DE | 10252315 | A1 | 6/2004 | |
| DE | 10306227 | A1 | 9/2004 | |
| DE | 102004013719 | A1 | 10/2005 | |
| DE | 102005032965 | A1 | 3/2007 | |
| DE | 102008035232 | A1 | 7/2008 | |
| DE | 102009034050 | A1 | 3/2010 | |
| DE | 102010017514 | A1 | 1/2011 | |
| DE | 102011000235 | A1 | 9/2011 | |
| DE | 102014205956 | A1 * | 10/2015 | H05K 7/209 |
| DE | 102014205958 | A1 * | 10/2015 | H01L 23/04 |
| EP | 2695795 | A1 | 2/2014 | |
| EP | 3196931 | A1 * | 7/2017 | H01L 23/12 |
| WO | WO2014005373 | A1 | 9/2012 | |

OTHER PUBLICATIONS

English translation of p. 7 of German Office Action dated Sep. 8, 2014 for German Patent Application No. DE 10 2014 205 957.7 (2 pages).

International Search Report and Written Opinion dated Jul. 10, 2015 for PCT/EP2015/053466 (German language, 8 pages).

International Search Report dated Jul. 10, 2015 for PCT/EP2015/053466 (English language, 3 pages).

* cited by examiner

DRIVER ASSEMBLY

RELATED APPLICATIONS

This application is a filing under 35 U.S.C. § 371 of International Patent Application PCT/EP2015/053466, filed Feb. 19, 2015, and claims the priority of German Patent Application DE 10 2014 205 957.7, filed Mar. 31, 2014, both of which are incorporated by reference herein in their entirety.

BACKGROUND

1. Technical Field

The invention relates to a driver assembly. In particular, the invention relates to the arrangements of elements of the driver assembly.

2. Background Information

A control unit, for example in a motor vehicle, is set up to provide a current or voltage to control a connected consumer. For example, a three-phase alternating voltage can be provided to control the direction of rotation, torque or rotational speed of a connected synchronous motor.

A driver assembly comprises multiple semiconductor switches to provide the required current or required voltage for the synchronous motor. Typically, the semiconductor switches do not operate without any loss, so that heat has to be dissipated. In order to keep supply lines to the semiconductor switches as short and direct as possible and to be able to cool them by means of a mutual cooling element, the semiconductor switches are typically arranged in the form of a matrix or randomly. Depending on their arrangement, the semiconductor switches heat up differently when operating, which results in different temperatures. Due to the different temperatures, the semiconductor switches can have different load capacities, thus reducing the total electric load of the driver assembly. In addition, the semiconductor switches can age at various degrees or levels, which results in different probabilities of failure. As a result, this can increase the probability of failure of the entire driver assembly. Furthermore, the supply lines to the semiconductor switches can be different in length, which may adversely affect an electromagnetic compatibility (EMC) or an impedance, or result in a voltage drop in the region of the supply lines.

BRIEF SUMMARY

It is the objective of the present invention to provide an improved driver assembly. The invention solves the problem by means of a driver assembly having the characteristics of the independent claim. The sub-claims describe preferred embodiments.

An invention-based driver assembly comprises a predetermined number of semiconductor switches, wherein one of the semiconductor switches is arranged inside a circular curve and the remaining semiconductor switches are arranged on the circular curve. As a result, the semiconductor switches can be heated evenly during periods of operation. Preferably, the one semiconductor switch is arranged adjacent to a central point of a circle and the remaining semiconductor switches are arranged on a circular curve about the central point. As a result, the even heating of the semiconductor switches can be further optimized. Thermal stresses of the semiconductor switches can be equal, so that electrical loads of the semiconductor switches can also be equal. This can increase the electrical load of the entire driver assembly. Alternatively, the semiconductor switches can be weaker in dimension while having the same load capacity. Because of having the same thermal stresses, the semiconductor switches can age at the same rate or same pace, so that the electrical loads can remain comparable over the lifespan of the semiconductor switches. The electrical load of the driver assembly can remain stable for a long time. This can increase the long-term reliability of the driver assembly. In particular, this is of advantage when activating safety-critical elements, for example, an electric steering aid in a motor vehicle.

Preferably, the semiconductor switches located on the circular curve are distributed evenly. Semiconductor switches located next to each other on the circular curve can have the same angle in relation to the central point. The arrangement of the semiconductor switches can be subject to tolerances in that at the surface of each semiconductor switch a specific point is selected, which maintains its position on the circular curve or in relation to the other semiconductor switches in the manner described above. In a different embodiment, the semiconductor switches have comparable designs and the points on the surfaces of the semiconductor switches are selected in a comparable manner. For example, the point can be selected at the geometric central point or in the area of the most intense heat during periods of operation.

Especially when the selected point has been selected in the area of the most intense heat, it is possible to select any rotational orientation of the individual semiconductor switches with regard to heat distribution. In a different embodiment, the individual semiconductor switches can be aligned to one another even with regard to smallest distances of their contours. This can be particularly advantageous when the surfaces of the semiconductor switches are relatively large and during periods of operation a surface is heated relatively evenly.

In a further embodiment, the semiconductor switches located on the circular curve can have equal distances to the central semiconductor switch. As a result, it is possible to better control the temperature increase of the central semiconductor switch which is potentially exposed most to a heat input by the remaining semiconductor switches. In this way, it is possible to achieve even temperatures of the semiconductor switches.

In an especially preferred embodiment, the driver assembly is set up to activate a three-phase synchronous motor. For this purpose, the driver assembly comprises three half bridges with a total of nine semiconductor switches. Each half bridge comprises three semiconductor switches, which are interconnected as high-side switch, low-side switch and phase separator. At the same time, the phase separator is provided with a phase connection for the synchronous motor to connect a center tap between the high-side switch and the low-side switch.

As a result, it is possible to provide a compact and thermally stable driver assembly for controlling the synchronous motor in which the additional phase separators improve controllability. In particular, it is possible to disconnect the synchronous motor by means of the phase separator when, for example, a defective condition has been detected. Thus, the safety condition of a synchronous motor in a safety-relevant or safety-critical system can be improved in that the synchronous motor cannot be short-circuited or energized. For example, the synchronous motor can be used in a motor vehicle for increasing or reducing the steering power of the driver. When the synchronous motor is disconnected, the steering power cannot be increased or reduced. In this way, it is possible to ensure a predetermined steering response of the motor vehicle even in the event of a fault.

Preferably, the three semiconductor switches of the phase separator are arranged in series, and the three high-side switches are arranged on one side and the three low-side switches on the other side. At the same time, the semiconductor switch located in the center is inevitably a phase separator. This can improve the symmetry of heat distribution in the driver assembly. Furthermore, it is easier to guide electrical connections between the individual semiconductor switches without intersecting. An improved guidance of the connections can improve or adjust electromagnetic compatibility, impedance and power resistance of the connections. As a result, the driver assembly can be controlled more precisely or is less susceptible to fault.

The semiconductor switches can involve surface-mounted components with the same pin assignments. This can further improve the line arrangement between the semiconductor switches, especially in the arrangement just described. The electrical connections which carry the current flowing through the phases of the synchronous motor can be easier conducted in the plane without intersecting. This makes it easier to plan and produce a suitable circuit carrier for the semiconductor switches, for example, a circuit board or conductor track. Furthermore, it is easier to control the heat increase of the circuit carrier.

Preferably, a cooling element is provided for an attachment at the semiconductor switches. In particular, the cooling element can have a circular base which is attached to the individual semiconductor switches. This can result in a cylindrical arrangement of evenly cooled semiconductor switches which is comprised by the driver assembly. The cooling element can be attached to the semiconductor switches in such a way that the resulting unit can be handled separately which, for example, facilitates assembling the driver assembly in a control unit for activating the synchronous motor. In addition, the round shape of the cooling element or unit can correspond with a cylindrical form of the synchronous motor, thus allowing for an installation of the unit on the synchronous motor in space-saving manner.

In a preferred embodiment, the cooling element comprises a projection for an attachment on a surface-located electrical connecting element between two semiconductor switches. For example, in the case of the circuit carrier described above, a conductive path can be contacted through the projection. The projection can contribute to the fact that by means of the connecting element a heat input is reduced or compensated from one semiconductor switch to the next semiconductor switch. The projection can also be used for improving the mechanical attachment of the cooling element on the circuit carrier.

It is especially preferred that multiple projections are provided between the semiconductor switches in such a way that during periods of operation the semiconductor switches are heated to the same temperatures. For example, dimensioning and positioning of the projections can be determined by means of calculations, a simulation or by trial and error. The greater the volume of a projection, the stronger the heat dissipation, so that two semiconductor switches which are connected with a connecting element attached to the projection, can be better thermally insulated from one another.

In a further embodiment, a control device for activating the half bridges is provided. The control device is designed to control phase voltages or phase currents of the synchronous motor and to disconnect the synchronous motor by means of the phase separator if the specific phase voltages or phase currents indicate a default of one of the high-side switches or one of the low-side switches. A component comprising the driver assembly, the control device or the synchronous motor can thus be brought into a safe state even in the event of a fault. This can be especially advantageous in the safety-relevant system described above in a motor vehicle, for example, in the form of a steering aid.

BRIEF DESCRIPTION OF THE DRAWINGS

The invention is now described in more detail with reference to the enclosed figures, in which.

DETAILED DESCRIPTION OF THE DRAWINGS AND THE PRESENTLY PREFERRED EMBODIMENTS

Figure 1:
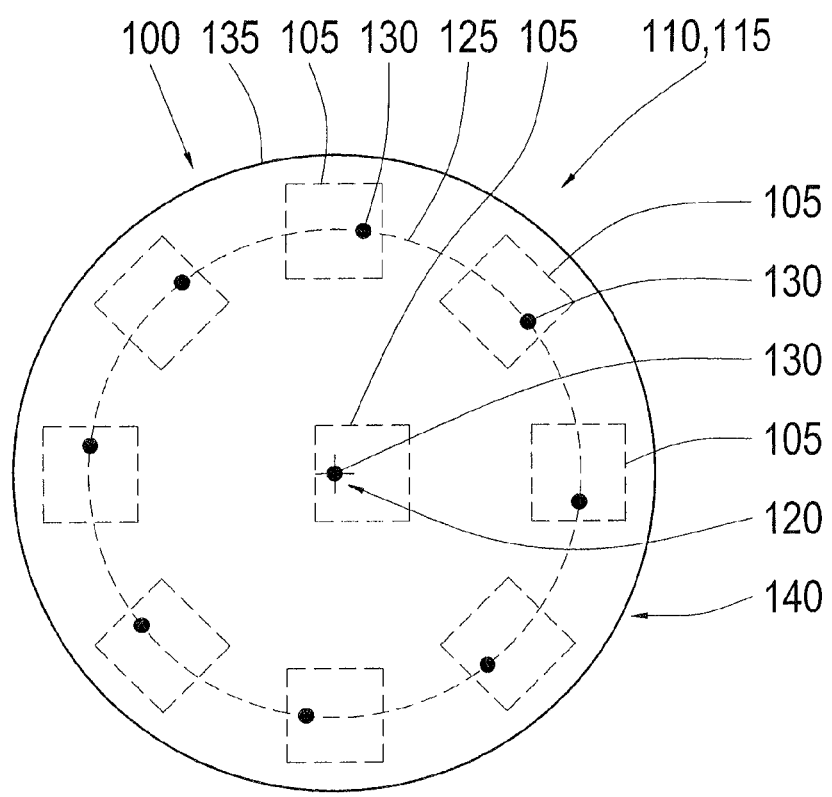
FIG. 1 represents an arrangement of semiconductor switches of a driver assembly.

FIG. 1 shows a schematic top view on a driver assembly 100 having multiple semi-conductor switches 105. Preferably, the semiconductor switches 105 involve surface-mounted components, which are arranged in a plane 110, and which in particular are formed by the surface of a circuit carrier 115, such as a circuit board. For example, the semiconductor switches can comprise bipolar transistors, field effect transistors, MOSFETs, thyristors, switching diodes or IGBTs. The nine semiconductor switches 105 have been provided in an exemplary manner, and their electrical configuration is subsequently described in more detail. One of the semiconductor switches 105 is arranged in the area of the central point 120 of a circular curve 125 while the remaining semiconductor switches 105 are arranged on the circular curve 125.

To determine the position of a semiconductor switch 105, one point 130 inside a contour can be selected, the exact position of which can be determined on the circular curve 125 or on the central point 120. Preferably, the semiconductor switches 105 have the same contours and the points 130 are selected at corresponding places. For example, the places can be selected based on geometric or thermal considerations, for example, at a geometrical center or at a point of most intense heat. In the representation shown in FIG. 1, the points 130 are selected correspondingly but eccentrically at the semiconductor switches. At the same time, the point 130 of the central semiconductor switch 105 coincides with the central point 120. The points 130 of the remaining eight semiconductor switches 105 are distributed evenly on the circular curve 125, so that adjacent points 130 include, respectively, an angle of 360°:8=45° in relation to the central point 120.

Preferably, the semiconductor switches 105 are thermally coupled with a cooling element 135. Preferably, the cooling element 135 has a round base 140 to attach to surfaces of the semiconductor switches 105. In a different embodiment, the base 140 can also have an evenly distributed polygonal shape with as many corners as semiconductor switches 105 are arranged on the circular curve 125. As a result, the driver assembly 100 can basically receive a cylindrical shape, which can correspond with a cylindrical shape of an end section of a synchronous motor, which can be controlled by the driver assembly 100. In the area of the end section, the driver assembly 100 can preferably be arranged at the synchronous motor in space-saving fashion. In particular, the driver assembly 100 can be arranged in the form of an axial extension of the end section, so that the driver assembly 100 can form a unit that can be separately managed with the synchronous motor. The synchronous motor and the driver assembly 100 can be arranged in a mutual housing.

By means of a thermally conductive pad, a thermally conductive paste or a mica disc, the cooling element 135 can be thermally better connected. This can result in an electrical insulation between the semiconductor switch 105 and the cooling element 135, which is especially advantageous when an electrical connection of the semiconductor switch 105 is located on its surface. For example, this is the case with so-called DirectFETs, which are preferably used as semiconductor switches 105 in the driver assembly 100.

Figure 2:
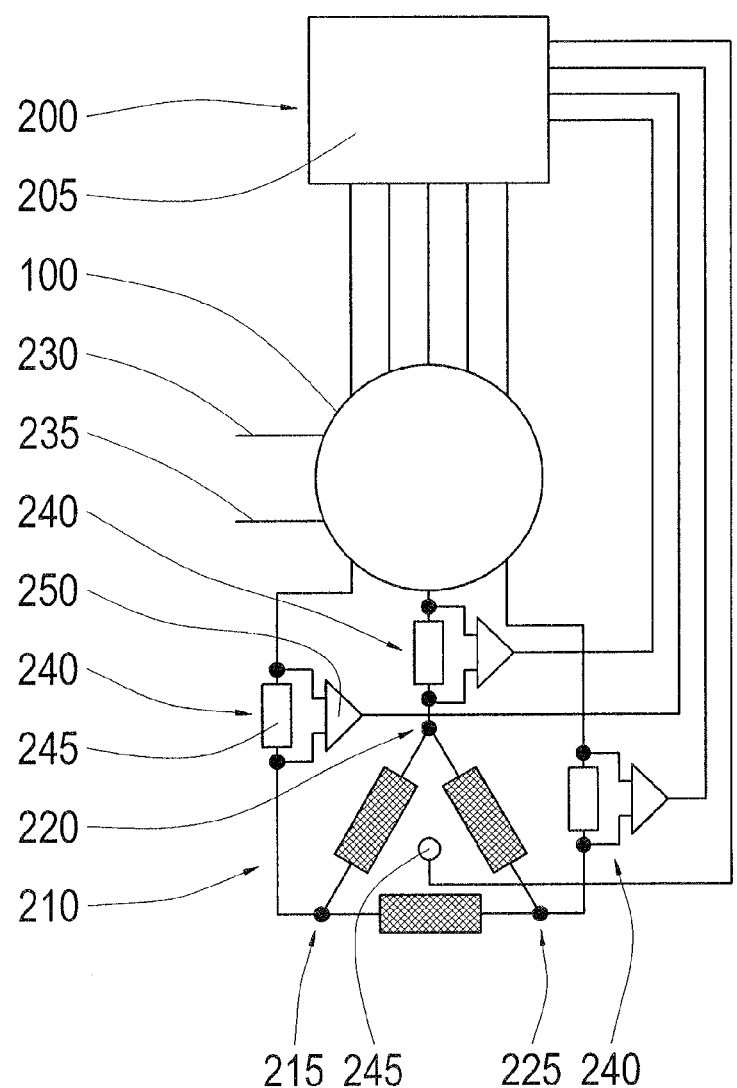
FIG. 2 a circuit diagram of a component with the driver assembly shown in FIG. 1.

FIG. 2 shows a control unit 200, which is especially used in motor vehicles. The control unit 200 comprises the driver assembly 100 shown in FIG. 1, as well as a control device 205 and is designed to activate a three-phase synchronous motor 210. In particular, the synchronous motor 210 can comprise an actuator, which has an effect on a safety-relevant or safety-critical function in the motor vehicle. For example, a steering system of a motor vehicle can comprise an electric steering servo unit, which is powered by the synchronous motor 210. In other embodiments, the synchronous motor 210 can also be provided for powering a different device in the motor vehicle, for example, a power window, the drive unit of an electric roof or a seat adjustment.

The synchronous motor 210 is configured in an exemplary manner in a star connection and comprises three phases 215 to 225, each of which are designed to be connected with a power source or current sink to control a direction of rotation, rotational speed or torque of the synchronous motor 210. In the following description, the term phase is generally used for one of the three electric connections of the three-phase synchronous motor 210 shown.

The three phases, 215 to 225, are connected with the control unit 200. The control device 205 is designed to activate the driver assembly 100 in such a way that the individual phases 215 to 225 are connected in a defined temporal sequence with a positive potential 230 or a negative potential 235 in such a way that a predetermined rotary motion or a predetermined torque occurs at the synchronous motor 210.

In addition, the control device 205 is preferably designed to determine a fault and then switch off the driver assembly 100 so that the three phases 215 to 225 are no longer connected with one another or with a potential 230 or 235.

For this purpose, each of the connections between the phases 215 to 225 and the driver assembly 100 can be provided with a sensor 240. The sensor 240 can be designed to determine a voltage applied to the respective phase 215 to 225 or a current flowing through the respective phase 215 to 225. In a further embodiment, only two sensors 240 are provided and the determination of a corresponding measuring value for the remaining phase 215 to 225 takes place analytically on the basis of Kirchhoff's law.

In the present embodiment, the sensors 240 are designed to determine phase currents. For this purpose, a sensor 240 comprises a series resistance 245, which is also called a shunt, and through which the current passes which flows through the respective phase 215 to 225. In the present, exemplary embodiment, a voltage which drops over the series resistance 245 is determined by means of a measuring amplifier 250, triggering a signal which is proportionate to the current flowing through the phase 215 to 225. Preferably, the signal is evaluated by the control device 205.

For example, a malfunction occurring in the area of the driver assembly 100 can result in the fact that one of the phases 215 to 225 is permanently connected with the positive potential 230 signal or the negative potential 235. In this case, it would be possible to determine a current flowing through the respective phase 215 to 225 even without activating the driver assembly 100. This malfunction can also be detected by observing the phase voltage.

In a further embodiment, a rotating sensor 245 can be provided to scan the rotary motion of the synchronous motor 210. The rotating sensor 245 can be connected with the control device 205 and the control device 205 can control the temporal sequence of the phase currents, depending on the rotating signal of the rotating sensor 245. By means of the rotating sensor 245, it is also possible to determine a malfunction in which the synchronous motor 210 does not rotate in the manner expected by the activation of the phases 215 to 225, for example, because it is mechanically blocked and does not rotate at all independent from its means of activation.

If a malfunction is determined, the control device 205 can disconnect the driver assembly 100. For this purpose, dedicated semiconductor switches 105 are preferably provided in the driver assembly 100, which dedicated semiconductor switches 105 are activated to disconnect an electric connection between the phases 215 to 225 and further semiconductor switches 105 of the driver assembly 100, which is subsequently described in more detail.

Figure 3:
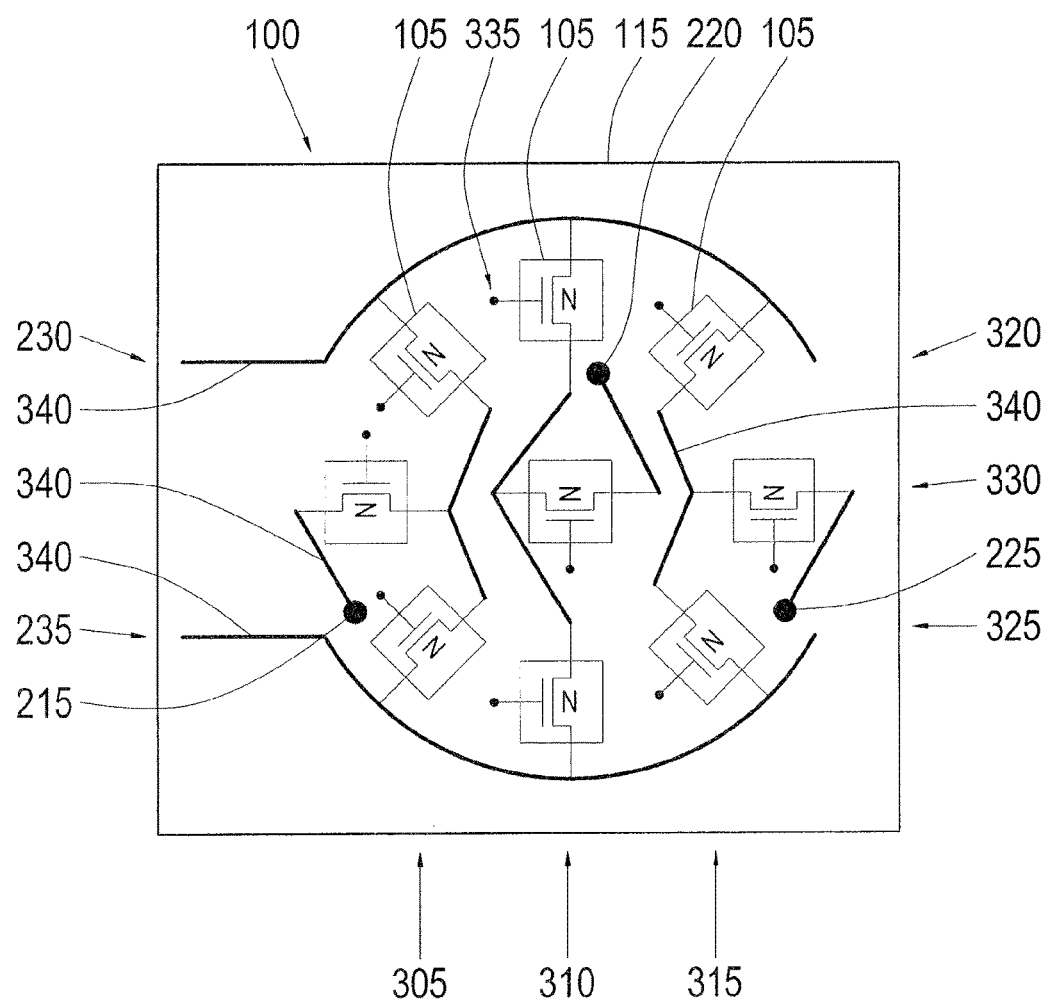
FIG. 3 a line arrangement between the semiconductor switches of the driver assembly shown in FIG. 1.

FIG. 3 shows an exemplary line arrangement between the semiconductor switches 105 of the driver assembly 100 shown in FIG. 1 for the control unit 200 shown in FIG. 2. For this purpose, a preferred arrangement of semiconductor switches 105 is used which correspond to the embodiment shown in FIG. 1. FIG. 1 shows a top view on a circuit board 115 without the cooling element 135. Electrical connections are shown in the form of a diagram.

In the preferred embodiment shown, the nine semiconductor switches 105 are organized in three half bridges 305 to 315. Each half bridge 305 to 315 comprises three semiconductor switches 105, of which one is used as high-side switch 320, one as low-side switch 325 and one as phase separator 330. The phase separator 330 of a half bridge 305 to 315 is designed to produce a switchable connection to one of the phases 215 to 225. The connection of the phase separator 330, which is in this way switchably connected with the respective phase 215 to 225, is connected with a connection of the high-side switch 320, in order to be connected with the positive potential 230, and with a connection to the low-side switch 325, in order to be connected with the negative potential 235. In the process, by means of a typical activation, it is avoided that the high-side switch 320 and the low-side switch 325 of the same half bridge 305 to 315 are closed at the same time.

Preferably, the semiconductor switches 105 have the same pin assignment. For this purpose, it is possible to use semiconductor switches 105 of the same type. In a different embodiment, the semiconductor switches 105 of a high-side switch 320 and a low-side switch 325 can form a complementary pair, wherein it is possible to reverse the pin assignments.

It is also preferred that the semiconductor switches 105 can be mounted on the surface. In the representation shown in FIG. 3, the semiconductor switches are mounted on the surface of the circuit carrier 115. In particular, the semiconductor switches 105 can comprise field effect transistors, which are preferably used in the design of DirectFETs.

Preferably, each of the nine semiconductor switches 105 shown can be activated. Each semiconductor switch 105 is provided with a control port 335, which can be connected with the control device 205. As described above, the other two connections of each semiconductor switch 105 are electrically connected with one another by means of connecting elements 340, which are shown in FIG. 3 schematically in the form of broad lines. Preferably, the semiconductor switches 105 are arranged in such a way in relation to the central point 120 and the circular curve 125 (both not shown) that the three phase separators 330 form one row or a straight line. At the same time, two of the phase separators 330 are also located on the circular curve 125 and the third phase separator 330 is located between them on the line in the area of the central point 120. Preferably, the high-side switches 320 are arranged on one side of the line, in FIG. 3 on the top side, while the low-side switches 325 are arranged on the other side, in FIG. 3 on the bottom side. This means that the high-side switches 320, as well as the low-side switches 325 are located on the circular curve 125.

Connections between the semiconductor switches 105, between the semiconductor switches 105 and the potentials 230 and 235, and between the semiconductor switches 105 and connections for the phases 215 to 225 can easily be carried out without intersecting and can also be kept short, as shown in FIG. 3. Connections between the control ports 335 and the control device 205 can be unbundled in well-known manner. In a preferred embodiment, all electrical connections, which lead to control ports 335, are guided in a different plane than the connecting elements 340, which carry the currents that flow through the phases 215 to 225 of the synchronous motor 210. For this purpose, it is possible to use a circuit carrier 115 with multiple planes on which the connecting elements 340 can be guided. In the embodiment shown, the current-carrying connecting elements 340 are guided on the top side of the circuit carrier 115, while connecting elements for contacting the control ports 335 can be run by means of through-connections on the bottom side of the circuit carriers 115.

Figure 4:
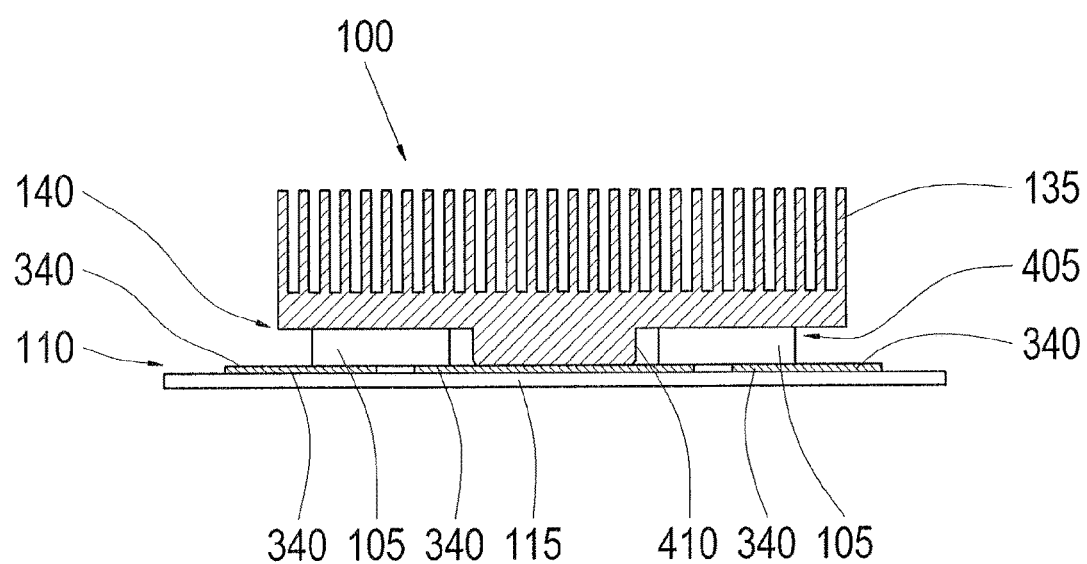
FIG. 4 a lateral view of the driver assembly shown in FIG. 1.

FIG. 4 shows a lateral view of an embodiment of the driver assembly 100 shown in FIG. 1. The base 140 of the cooling element 135 adjoins upper surfaces of the semiconductor switches 105. Preferably, the thermal coupling of the cooling element 135 and the semiconductor switches 105 is performed by means of an intermediate heat conducting medium 405. Preferably, the heat conducting medium 405 has lower heat resistance and is designed to bridge gaps of various thickness between the upper surface of the semiconductor switches 105 and the base 140 of the cooling element 135. As a result, it is possible to compensate vertical mounting tolerances of the semiconductor switches 105. Furthermore, it is preferred that the heat conducting medium 405 is electrically insulating. For example, the heat conducting medium 405 can involve a thermally conductive pad, a thermally conductive paste or a mic disc.

The cooling element 135 can comprise a projection 410, which is designed to be attached to a connecting element 340. It is also possible to provide a heat conducting medium 405 between the projection 410 and the connecting element 340. By means of the projection 410, the connecting element 340 can be better cooled. As a result, it is possible to reduce the heat input along the connecting element 340 to one of the semiconductor switches 105. By means of the projection 410, it is especially possible to cool a connecting element 340, which electrically connects two semiconductor switches 105 with one another. In this way, the thermal insulation of the two semiconductor switches 105 can be improved.

The size, position and shape of the projection 410 can be selected in such a way that a heat flow between the semiconductor switches 105 is affected in such a way that when operating the semiconductor switches 105 are basically heated evenly. It is possible to provide multiple projections 410 between pairs of semiconductor switches 106, wherein the projections 410 can have different shapes. The sizes and shapes of the projections 410 can be selected in such a way that it is possible to ensure that when operating the semiconductor switches 105 are evenly heated.

In general it is preferred that the projections 410 extend only to the connecting elements 340 (depicted in FIG. 3 in the form of broad lines), which are energized by currents flowing through the phases 215 to 225 of the synchronous motor 210.

REFERENCE NUMERALS 100 driver assembly
105 semiconductor switch
110 plane
115 circuit carrier (circuit board)
120 central point
125 circular curve
130 point
135 cooling element
140 base
200 control unit
205 control device
210 three-phase-synchronous motor
215 first phase
220 second phase
225 third phase
230 positive potential
235 negative potential
240 sensor
245 series resistance (shunt)
250 measuring amplifier
305 first half bridge
310 second half bridge
315 third half bridge
320 high-side switch
325 low-side switch
330 phase separator
335 control port
340 connecting element
405 heat conducting medium
410 projection

What is claimed is:
1. A driver assembly comprising:
a predetermined number of semiconductor switches comprising all of the semiconductor switches of the driver assembly,
wherein a single semiconductor switch of the predetermined number of semiconductor switches is arranged inside a circular curve, and wherein all of the remaining semiconductor switches of the predetermined number of semiconductor switches are arranged on the circular curve.
2. The driver assembly of claim 1, wherein the semiconductor switches located on the circular curve are distributed evenly.
3. The driver assembly of claim 1, wherein the semiconductor switches located on the circular curve are each located the same distance from the one of the semiconductor switches arranged inside the circular curve.

4. The driver assembly of claim 1, wherein a total of nine semiconductor switches are provided; and the driver assembly comprises three half bridges for activating a three-phase synchronous motor;
  wherein each half bridge comprises three semiconductor switches, which can be interconnected as high-side switch, low-side switch and phase separator; and
  wherein the phase separator is provided for connecting a center tap between the high-side switch and the low-side switch with a phase connection of the synchronous motor.

5. The driver assembly of claim 4, wherein the three semiconductor switches of the phase separator are arranged in a row and that on one side of the row the three high-side switches are arranged and on the other side of the row the three low-side switches are arranged.

6. The driver assembly of claim 1, wherein the semiconductor switches involve surface-mounted components with the same pin assignments.

7. The driver assembly of claim 1, wherein the driver assembly further comprises a cooling element for an attachment at the semiconductor switches.

8. The driver assembly of claim 7, wherein the cooling element comprises a projection for an attachment at an electrical connecting element located on the surface between two semiconductor switches.

9. The driver assembly of claim 8, wherein multiple projections are provided between the semiconductor switches in such a way that when operating the semiconductor switches are heated to the same temperatures.

10. The driver assembly of claim 4, wherein the driver assembly further comprises a control device for activating the half bridges; wherein the control device is also designed to control phase voltages and phase currents of the synchronous motor and to disconnect the synchronous motor via the phase separator when the specific phase voltages or phase currents indicate a defective condition of one of the high-side switches or one of the low-side switches.

11. The driver assembly of claim 2, wherein the semiconductor switches located on the circular curve have the same distance to the semiconductor switch located in the center.

12. The driver assembly of claim 2, wherein a total of nine semiconductor switches are provided; and the driver assembly comprises three half bridges for activating a three-phase synchronous motor;
  wherein each half bridge comprises three semiconductor switches, which can be interconnected as high-side switch, low-side switch and phase separator; and
  wherein the phase separator is provided for connecting a center tap between the high-side switch and the low-side switch with a phase connection of the synchronous motor.

13. The driver assembly of claim 12, wherein the three semiconductor switches of the phase separator are arranged in a row and that on one side of the row the three high-side switches are arranged and on the other side of the row the three low-side switches are arranged.

14. The driver assembly of claim 3, wherein a total of nine semiconductor switches are provided; and the driver assembly comprises three half bridges for activating a three-phase synchronous motor;
  wherein each half bridge comprises three semiconductor switches, which can be interconnected as high-side switch, low-side switch and phase separator; and
  wherein the phase separator is provided for connecting a center tap between the high-side switch and the low-side switch with a phase connection of the synchronous motor.

15. The driver assembly of claim 14, wherein the three semiconductor switches of the phase separator are arranged in a row and that on one side of the row the three high-side switches are arranged and on the other side of the row the three low-side switches are arranged.

16. The driver assembly of claim 2, wherein the semiconductor switches involve surface-mounted components with the same pin assignments.

17. The driver assembly of claim 2, wherein the driver assembly further comprises a cooling element for an attachment at the semiconductor switches.

18. The driver assembly of claim 17, wherein the cooling element comprises a projection for an attachment at an electrical connecting element located on the surface between two semiconductor switches.

19. The driver assembly of claim 18, wherein multiple projections are provided between the semiconductor switches in such a way that when operating the semiconductor switches are heated to the same temperatures.

20. The driver assembly of claim 12, wherein the driver assembly further comprises a control device for activating the half bridges; wherein the control device is also designed to control phase voltages and phase currents of the synchronous motor and to disconnect the synchronous motor via the phase separator when the specific phase voltages or phase currents indicate a defective condition of one of the high-side switches or one of the low-side switches.

* * * * *